(12) United States Patent
Spahl et al.

(10) Patent No.: US 9,045,015 B2
(45) Date of Patent: Jun. 2, 2015

(54) LATERALLY TILTABLE, MULTITRACK VEHICLE

(71) Applicant: FORD GLOBAL TECHNOLOGIES, LLC, Dearborn, MI (US)

(72) Inventors: Robert Spahl, Cologne (DE); Edmund Halfmann, Neuss (DE); Torsten Gerhardt, London (GB); Marc Simon, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/201,602

(22) Filed: Mar. 7, 2014

(65) Prior Publication Data

US 2014/0252734 A1 Sep. 11, 2014

(30) Foreign Application Priority Data

Mar. 7, 2013 (DE) .................. 10 2013 203 927

(51) Int. Cl.
*B62D 9/02* (2006.01)
*B60G 21/073* (2006.01)
*B60G 17/00* (2006.01)
(Continued)

(52) U.S. Cl.
CPC ............ *B60G 17/00* (2013.01); *B60G 2204/62* (2013.01); *B60G 2800/016* (2013.01); *B62D 61/06* (2013.01); *B62D 63/04* (2013.01); *B62D 31/003* (2013.01); *B60G 21/073* (2013.01); (Continued)

(58) Field of Classification Search
CPC ............... B60G 17/00; B60G 2204/62; B60G 2800/016; B62D 61/06; B62D 63/04

USPC .............. 280/5.509, 5.508, 124.156–124.161
See application file for complete search history.

(56) References Cited

U.S. PATENT DOCUMENTS 2,353,503 A * 7/1944 Rost et al. .................. 280/5.509
2,474,471 A * 6/1949 Dolan .......................... 105/164
(Continued)

FOREIGN PATENT DOCUMENTS

DE 679 966 C 8/1939
DE 1 937 578 U 1/1963
(Continued)

OTHER PUBLICATIONS

German Search Report for Application No. 10 2013 203 923.9 dated Oct. 8, 2013. (.0088).
(Continued)

*Primary Examiner* — Drew Brown
(74) *Attorney, Agent, or Firm* — Jones Robb PLLC; Raymond L. Coppiellie

(57) ABSTRACT

A laterally tiltable, multitrack vehicle is disclosed. The vehicle includes a vehicle body and three wheels. The first and second wheels are assigned to a common axle to form a first wheel pair. A first cylinder unit supports the first wheel of the wheel pair on the vehicle body and a second cylinder unit supports the second wheel of the wheel pair on the vehicle body. Each cylinder unit includes a first cylinder and a second cylinder connected in series. Each first cylinder has a first diameter and each second cylinder has a second diameter larger than the first diameter. The first and second cylinder units are fluidly connected to each other. Fluid is transferable between cylinder units between a first cylinder of the one cylinder unit and a second cylinder of the other cylinder unit.

19 Claims, 2 Drawing Sheets

(51) Int. Cl.
   *B62D 61/06* (2006.01)
   *B62D 63/04* (2006.01)
   *B62D 31/00* (2006.01)

(52) U.S. Cl.
   CPC ..... *B60G 2204/82* (2013.01); *B60G 2204/8304* (2013.01); *B60G 2300/45* (2013.01)

(56) References Cited

U.S. PATENT DOCUMENTS

| | | | |
|---|---|---|---|
| 3,417,985 A * | 12/1968 | Hannan | 267/186 |
| 3,572,456 A | 3/1971 | Healy | |
| 5,040,812 A | 8/1991 | Patin | |
| 5,040,823 A | 8/1991 | Lund | |
| 5,069,476 A | 12/1991 | Tsutsumi et al. | |
| 5,116,069 A | 5/1992 | Miller | |
| 5,161,425 A | 11/1992 | Baskett et al. | |
| 5,161,822 A | 11/1992 | Lund | |
| 5,207,451 A | 5/1993 | Furuse et al. | |
| 5,337,847 A | 8/1994 | Woods et al. | |
| 5,347,457 A | 9/1994 | Tanaka et al. | |
| 5,580,089 A | 12/1996 | Kolka | |
| 5,611,555 A | 3/1997 | Vidal | |
| 5,762,351 A | 6/1998 | SooHoo | |
| 5,765,115 A | 6/1998 | Ivan | |
| 5,765,846 A | 6/1998 | Braun | |
| 5,772,224 A | 6/1998 | Tong | |
| 5,791,425 A | 8/1998 | Kamen et al. | |
| 5,825,284 A | 10/1998 | Dunwoody et al. | |
| 5,839,082 A | 11/1998 | Iwasaki | |
| 5,927,424 A | 7/1999 | Van Den Brink et al. | |
| 6,026,920 A | 2/2000 | Obeda et al. | |
| 6,116,618 A | 9/2000 | Shono et al. | |
| 6,149,226 A | 11/2000 | Hoelzel | |
| 6,250,649 B1 | 6/2001 | Braun | |
| 6,311,795 B1 | 11/2001 | Skotnikov | |
| 6,328,125 B1 | 12/2001 | Van Den Brink et al. | |
| 6,390,505 B1 | 5/2002 | Wilson | |
| 6,425,585 B1 | 7/2002 | Schuelke et al. | |
| 6,435,522 B1 | 8/2002 | Van Den Brink et al. | |
| 6,446,980 B1 | 9/2002 | Kutscher et al. | |
| 6,454,035 B1 | 9/2002 | Waskow et al. | |
| 6,467,783 B1 | 10/2002 | Blondelet et al. | |
| 6,805,362 B1 | 10/2004 | Melcher | |
| 6,817,617 B2 * | 11/2004 | Hayashi | 280/5.509 |
| 7,066,474 B2 | 6/2006 | Hiebert et al. | |
| 7,073,806 B2 | 7/2006 | Bagnoli | |
| 7,097,187 B2 | 8/2006 | Walters et al. | |
| 7,229,086 B1 | 6/2007 | Rogers | |
| 7,389,592 B2 | 6/2008 | Tsuruta et al. | |
| 7,487,985 B1 | 2/2009 | Mighell | |
| 7,591,337 B2 | 9/2009 | Suhre et al. | |
| 7,640,086 B2 | 12/2009 | Nakashima et al. | |
| 7,641,207 B2 | 1/2010 | Yang | |
| 7,648,148 B1 | 1/2010 | Mercier | |
| 7,665,742 B2 | 2/2010 | Haerr et al. | |
| 7,673,883 B2 | 3/2010 | Damm | |
| 7,887,070 B2 | 2/2011 | Kirchner | |
| 7,896,360 B2 | 3/2011 | Buma | |
| 7,946,596 B2 | 5/2011 | Hsu et al. | |
| 8,050,820 B2 | 11/2011 | Yanaka et al. | |
| 8,260,504 B2 | 9/2012 | Tsujii et al. | |
| 8,262,111 B2 * | 9/2012 | Lucas | 280/124.103 |
| 8,345,096 B2 | 1/2013 | Ishiyama et al. | |
| 2001/0028154 A1 | 10/2001 | Sebe | |
| 2002/0109310 A1 | 8/2002 | Lim et al. | |
| 2002/0171216 A1 | 11/2002 | Deal | |
| 2003/0071430 A1 | 4/2003 | Serra et al. | |
| 2003/0102176 A1 | 6/2003 | Bautista | |
| 2003/0197337 A1 | 10/2003 | Dodd et al. | |
| 2004/0051262 A1 | 3/2004 | Young | |
| 2004/0100059 A1 | 5/2004 | Van Den Brink | |
| 2004/0134302 A1 | 7/2004 | Ko et al. | |
| 2004/0236486 A1 | 11/2004 | Krause et al. | |
| 2005/0051976 A1 | 3/2005 | Blondelet et al. | |
| 2005/0082771 A1 | 4/2005 | Oh | |
| 2005/0127656 A1 | 6/2005 | Sato et al. | |
| 2005/0184476 A1 | 8/2005 | Hamm | |
| 2005/0199087 A1 | 9/2005 | Li et al. | |
| 2005/0206101 A1 | 9/2005 | Bouton | |
| 2005/0275181 A1 | 12/2005 | MacIsaac | |
| 2006/0049599 A1 | 3/2006 | Lehane | |
| 2006/0151982 A1 | 7/2006 | Mills | |
| 2006/0170171 A1 | 8/2006 | Pedersen | |
| 2006/0220331 A1 | 10/2006 | Schafer et al. | |
| 2006/0226611 A1 | 10/2006 | Xiao et al. | |
| 2006/0249919 A1 | 11/2006 | Suzuki et al. | |
| 2006/0276944 A1 | 12/2006 | Yasui et al. | |
| 2007/0075517 A1 | 4/2007 | Suhre et al. | |
| 2007/0078581 A1 | 4/2007 | Nenninger et al. | |
| 2007/0126199 A1 | 6/2007 | Peng et al. | |
| 2007/0151780 A1 | 7/2007 | Tonoli et al. | |
| 2007/0182120 A1 | 8/2007 | Tonoli et al. | |
| 2007/0193803 A1 | 8/2007 | Geiser | |
| 2007/0193815 A1 | 8/2007 | Hobbs | |
| 2007/0228675 A1 | 10/2007 | Tonoli et al. | |
| 2008/0012262 A1 | 1/2008 | Carabelli et al. | |
| 2008/0033612 A1 | 2/2008 | Raab | |
| 2008/0100018 A1 | 5/2008 | Dieziger | |
| 2008/0114509 A1 | 5/2008 | Inoue et al. | |
| 2008/0135320 A1 | 6/2008 | Matthies | |
| 2008/0164085 A1 | 7/2008 | Cecinini | |
| 2008/0197597 A1 | 8/2008 | Moulene et al. | |
| 2008/0197599 A1 | 8/2008 | Comstock et al. | |
| 2008/0238005 A1 * | 10/2008 | James | 280/5.509 |
| 2008/0255726 A1 | 10/2008 | Fischlein et al. | |
| 2008/0258416 A1 | 10/2008 | Wilcox | |
| 2008/0272562 A1 | 11/2008 | Sabelstrom et al. | |
| 2009/0085311 A1 | 4/2009 | Kim et al. | |
| 2009/0105906 A1 | 4/2009 | Hackney et al. | |
| 2009/0108555 A1 | 4/2009 | Wilcox | |
| 2009/0171530 A1 | 7/2009 | Bousfield | |
| 2009/0289437 A1 | 11/2009 | Steinhilber | |
| 2009/0299565 A1 | 12/2009 | Hara et al. | |
| 2009/0312908 A1 | 12/2009 | Van Den Brink | |
| 2009/0314566 A1 | 12/2009 | Rust | |
| 2010/0025944 A1 | 2/2010 | Hara et al. | |
| 2010/0032914 A1 | 2/2010 | Hara et al. | |
| 2010/0032915 A1 | 2/2010 | Hsu et al. | |
| 2010/0044977 A1 | 2/2010 | Hughes et al. | |
| 2010/0152987 A1 | 6/2010 | Gorai | |
| 2011/0006498 A1 | 1/2011 | Mercier | |
| 2011/0095494 A1 * | 4/2011 | White | 280/5.509 |
| 2011/0148052 A1 | 6/2011 | Quemere | |
| 2011/0215544 A1 | 9/2011 | Rhodig | |
| 2011/0254238 A1 | 10/2011 | Kanou | |
| 2012/0248717 A1 * | 10/2012 | Tsujii et al. | 280/5.509 |
| 2013/0068550 A1 * | 3/2013 | Gale | 180/216 |
| 2013/0153311 A1 | 6/2013 | Huntzinger | |
| 2013/0168934 A1 | 7/2013 | Krajekian | |
| 2014/0252730 A1 | 9/2014 | Spahl et al. | |
| 2014/0252731 A1 | 9/2014 | Spahl et al. | |
| 2014/0252732 A1 | 9/2014 | Spahl et al. | |
| 2014/0252733 A1 | 9/2014 | Spahl et al. | |

FOREIGN PATENT DOCUMENTS

| | | |
|---|---|---|
| DE | 6801096 U | 11/1967 |
| DE | 40 35 128 A1 | 6/1992 |
| DE | 41 35 585 A1 | 5/1993 |
| DE | 42 36 328 C1 | 9/1993 |
| DE | 43 15 017 C1 | 9/1994 |
| DE | 196 21 947 C1 | 10/1997 |
| DE | 197 35 912 A1 | 3/1998 |
| DE | 198 48 294 A1 | 10/1999 |
| DE | 198 38 328 C1 | 12/1999 |
| DE | 198 31 162 A1 | 7/2000 |
| DE | 102 51 946 B3 | 3/2004 |
| DE | 103 49 655 A1 | 6/2005 |
| DE | 10 2004 027 202 | 10/2005 |
| DE | 10 2004 058 523 A1 | 6/2006 |
| DE | 11 2006 002 581 T5 | 9/2008 |
| DE | 10 2008 046 588 A1 | 3/2010 |
| DE | 10 2009 042 662 A1 | 3/2011 |

(56) References Cited

FOREIGN PATENT DOCUMENTS

| | | |
|---|---|---|
| DE | 10 2010 000 884 A1 | 7/2011 |
| DE | 10 2010 000 886 A1 | 7/2011 |
| DE | 10 2010 055 947 A1 | 8/2011 |
| EP | 0 592 377 A1 | 4/1994 |
| EP | 0 626 307 A1 | 11/1994 |
| EP | 0 658 453 B1 | 6/1995 |
| EP | 1 030 790 B1 | 8/2000 |
| EP | 1 142 779 A2 | 10/2001 |
| EP | 1 153 773 A2 | 11/2001 |
| EP | 1 155 950 A2 | 11/2001 |
| EP | 1 180 476 B1 | 2/2002 |
| EP | 1 228 905 A2 | 8/2002 |
| EP | 1 346 907 A2 | 9/2003 |
| EP | 1 348 617 B1 | 10/2003 |
| EP | 1 419 909 B1 | 5/2004 |
| EP | 1 539 563 B1 | 6/2005 |
| EP | 1 630 081 A1 | 3/2006 |
| EP | 1 702 773 A2 | 9/2006 |
| EP | 1 872 981 A1 | 1/2008 |
| EP | 1 944 228 A1 | 7/2008 |
| EP | 2 030 814 A2 | 3/2009 |
| EP | 2 199 122 A1 | 6/2010 |
| EP | 2 213 561 A1 | 8/2010 |
| FR | 2 663 283 A1 | 12/1991 |
| FR | 2 768 203 A1 | 3/1999 |
| FR | 2 872 699 A1 | 1/2006 |
| FR | 2 927 026 A1 | 8/2009 |
| FR | 2 937 000 A1 | 4/2010 |
| FR | 2 946 944 A1 | 12/2010 |
| GB | 2 322 837 A | 9/1998 |
| GB | 2 382 334 A | 11/2001 |
| GB | 2 374 327 A | 10/2002 |
| GB | 2 390 065 A | 12/2003 |
| GB | 2 394 701 A | 5/2004 |
| GB | 2 444 250 A | 6/2008 |
| GB | 2 450 740 A | 1/2009 |
| GB | 2 472 180 A | 2/2011 |
| GB | 2 492 757 A | 1/2013 |
| JP | 4-69710 A | 3/1992 |
| JP | 4-71918 A | 3/1992 |
| JP | 4-108018 A | 4/1992 |
| JP | 2001-206036 A | 7/2001 |
| JP | 2003-81165 A | 3/2003 |
| JP | 2004-306850 A | 11/2004 |
| JP | 2005-193890 A | 7/2005 |
| JP | 2006-7865 A | 1/2006 |
| JP | 2006-44467 A | 2/2006 |
| JP | 2006-168503 A | 6/2006 |
| JP | 2006-232197 A | 9/2006 |
| JP | 2006-281918 A | 10/2006 |
| JP | 2006-341718 A | 12/2006 |
| JP | 2007-10511 A | 1/2007 |
| JP | 2007-69688 A | 3/2007 |
| JP | 2007-106332 A | 4/2007 |
| JP | 2007-161013 A | 6/2007 |
| JP | 2007-186179 A | 7/2007 |
| JP | 2007-210456 A | 8/2007 |
| JP | 2007-238056 A | 9/2007 |
| JP | 2008-1236 A | 1/2008 |
| JP | 2008-62854 A | 3/2008 |
| JP | 2008-120360 A | 5/2008 |
| JP | 2008-132933 A | 6/2008 |
| JP | 2009-270918 A | 11/2009 |
| JP | 2010-155486 A | 7/2010 |
| JP | 2010-168000 A | 8/2010 |
| WO | 94/06642 A1 | 3/1994 |
| WO | 96/27508 A1 | 9/1996 |
| WO | 97/09223 A1 | 3/1997 |
| WO | 97/27071 A1 | 7/1997 |
| WO | 99/41136 A1 | 8/1999 |
| WO | 99/47372 A1 | 9/1999 |
| WO | 99/54186 A1 | 10/1999 |
| WO | 02/24477 A1 | 3/2002 |
| WO | 02/068228 A1 | 9/2002 |
| WO | 03/021190 A1 | 3/2003 |
| WO | 03/057549 A1 | 7/2003 |
| WO | 2004/011319 A1 | 2/2004 |
| WO | 2004/041621 A1 | 5/2004 |
| WO | 2005/039955 A2 | 5/2005 |
| WO | 2005/058620 A1 | 6/2005 |
| WO | 2006/006859 A2 | 1/2006 |
| WO | 2006/129020 A1 | 12/2006 |
| WO | 2008/043870 A1 | 4/2008 |
| WO | 2008/044838 A1 | 4/2008 |
| WO | 2008/053827 A1 | 5/2008 |
| WO | 2008/065436 A1 | 6/2008 |
| WO | 2009/059099 A2 | 5/2009 |
| WO | 2009/074752 A2 | 6/2009 |
| WO | 2009/087595 A1 | 7/2009 |
| WO | 2010/009928 A1 | 1/2010 |
| WO | 2010/015986 A1 | 2/2010 |
| WO | 2010/015987 A1 | 2/2010 |
| WO | 2010/035877 A1 | 4/2010 |
| WO | 2010/106385 A1 | 9/2010 |
| WO | 2010/116641 A1 | 10/2010 |
| WO | 2011/023862 A1 | 3/2011 |
| WO | 2011/053228 A1 | 5/2011 |
| WO | 2011/059456 A1 | 5/2011 |
| WO | 2011/074204 A1 | 6/2011 |
| WO | 2011/083335 A2 | 7/2011 |
| WO | 2011/107674 A1 | 9/2011 |

OTHER PUBLICATIONS

German Search Report for Application No. 10 2013 203 922.0 dated Oct. 14, 2013. (.0089).
German Search Report for Application No. 10 2013 203 927.1 dated Nov. 5, 2013. (.0090).
German Search Report for Application No. 10 2013 203 926.3 dated Oct. 31, 2013. (.0091).
German Search Report for Application No. 10 2013 203 924.7 dated Oct. 24, 2013. (.0092).
Office Action dated Nov. 28, 2014 for U.S. Appl. No. 14/201,550.
Office Action dated Dec. 19, 2014 for U.S. Appl. No. 14/201,586.
Office Action dated Sep. 4, 2014 for U.S. Appl. No. 14/201,628.
Office Action dated Dec. 26, 2014 of U.S. Appl. No. 14/201,628.

* cited by examiner

LATERALLY TILTABLE, MULTITRACK VEHICLE

CROSS REFERENCE TO RELATED APPLICATIONS

This application claims priority to German Application No. 102013203927.1, filed on Mar. 7, 2013, the entire content of which is incorporated by reference herein. This application also is related to German Application No. 102013203922.0, filed Mar. 7, 2013; German Application No. 102013203923.9, filed Mar. 7, 2013; German Application No. 102013203926.3, filed Mar. 7, 2013; and German Application No. 102013203924.7, filed Mar. 7, 2013, the entire content of each of which is incorporated by reference herein.

TECHNICAL FIELD

The present disclosure relates generally to a laterally tillable multitrack vehicle, such as a motor vehicle, and more particularly to a laterally tiltable multitrack vehicle having the ability to self-upright after tilting.

BACKGROUND

In recent years, interest in vehicles with innovative designs has grown in view of continued expansion of urban areas, the large number of vehicles operating in these areas, and the associated problems, such as traffic jams or environmental pollution. One way to solve parking problems and/or to improve the traffic flow is to design vehicles in a manner that permits a plurality of vehicles to share a parking space or a driving lane. In order for such a solution to be feasible, vehicles must be small and, in particular, narrow. A vehicle of this type is usually sized to convey no more than one to two persons. The small size and the low weight of such vehicles make it possible to reduce the engine power output and also the emissions caused by the vehicle without any loss of driving performance.

Many attempts have been made in recent years to develop multitrack, laterally tiltable vehicles, in which the entire vehicle or a part thereof tilts in toward a rotation center (e.g., the curve bend inner side) in a similar manner to a bicycle when driving around curves. With such tilting, the resultant of the weight force and the centrifugal force runs substantially along the vertical axis of the vehicle body, preventing the vehicle from turning over. Accordingly, lateral tipping of the vehicle toward the bend outer side can be prevented, even in the case of a relatively narrow track width of the laterally tiltable vehicle (as compared with conventional, multitrack vehicles).

Different types of laterally tiltable vehicles having three or four wheels have been disclosed in practice. For example, in some three-wheeled vehicles, merely the vehicle body and the central wheel can be tilted, whereas the wheel pair has two eccentric wheels which are arranged on a common axle and cannot be tilted. In general, however, a solution is preferred, in which all the wheels can tilt together with the vehicle body, since this solution requires less installation space in relation to the width of the vehicle and the vehicle is therefore of narrower overall design.

One important aspect in laterally tiltable vehicles is ability to right itself (self-uprighting) after tilting. Normally, the centroid of the vehicle drops during lateral tilting of the vehicle body. This means, however, that the vehicle body of the laterally tilted, multitrack vehicle will not upright itself again automatically. An elegant possibility for achieving automatic uprighting of the laterally tilted vehicle body is to raise the centroid of the vehicle during lateral tilting as the tilting angle increases. In addition, this solution affords the essential advantage that the vehicle automatically assumes a stable, upright position even at a standstill, since the centroid of the vehicle is at the lowest in this position. Accordingly, the present disclosure is directed to providing an automatic self-uprighting multitrack, laterally bitable vehicle. The present disclosure is further directed to providing such a vehicle having a compact overall design, in order to keep the required installation space as small as possible in order to realize a narrow vehicle.

SUMMARY

In accordance with various exemplary embodiments, the present disclosure provides a laterally tiltable, multitrack vehicle. The vehicle comprises a vehicle body and three wheels, wherein first and second wheels of the three wheels are assigned to a common axle to form a first wheel pair. A first cylinder unit supports the first wheel of the wheel pair on the vehicle body and a second cylinder unit supports the second wheel of the wheel pair on the vehicle body. Each cylinder unit includes a first cylinder and a second cylinder connected in series, each first cylinder has a first diameter and each second cylinder has a second diameter, larger than the first diameter. The first and second cylinder units are fluidly connected to each other and fluid is transferable between the cylinder units via a first cylinder of one cylinder unit and a second cylinder of the other cylinder unit and vice versa.

In accordance with one aspect of the present disclosure, the laterally tiltable, multitrack vehicle is a motor vehicle.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1A:
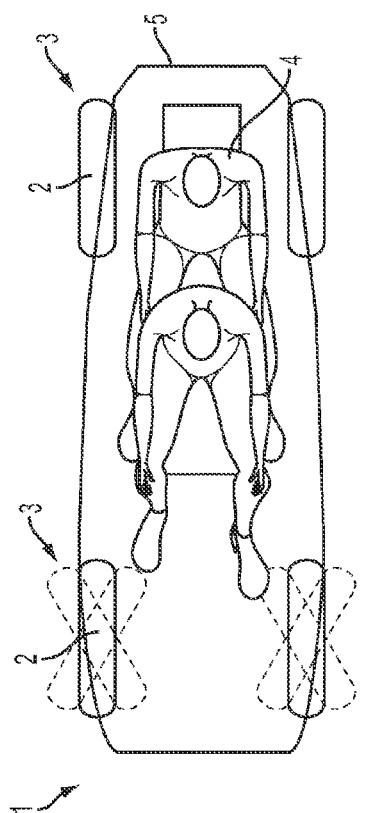
FIG. 1A shows a plan view of a first exemplary embodiment of a multitrack, laterally tillable vehicle in accordance with the present disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a laterally tiltable, multitrack motor vehicle is provided. The vehicle has at least three wheels, a vehicle body, for example a vehicle frame, and at least one wheel pair. The wheel pair includes two wheels which are assigned to a common axle. Each of the wheels of the wheel pair is suspended on the vehicle body via a respective cylinder unit which operates with a pneumatic or hydraulic fluid. In the context of the present disclosure, a cylinder unit comprises at least one cylinder, in which a piston is axially and displaceably guided. Moreover, the piston is generally connected to a piston rod.

In accordance with the present disclosure, each cylinder unit comprises two cylinders, having different internal diameters and connected in series. A piston is axially and displaceably guided in each cylinder unit. The cylinder unit associated with each wheel of the wheel pair are fluidly connected to one another. In particular, cylinders of the same size are connected to one another within a wheel pair. For example, the two cylinders with a smaller internal diameter of both cylinder units of the same wheel pair are connected in a fluid-conducting manner to one another at their axial ends, and the two cylinders with a larger internal diameter of the two cylinder units are likewise connected in a fluid-conducting manner to one another at their axial ends. Accordingly, the two cylinder units of the same wheel pair form a dosed, pneumatic or hydraulic circuit, in which the fluid contained therein, for example air or hydraulic oil, can be displaced between the two cylinder units of the same wheel pair by means of the pistons which are guided in the respective cylinders.

By means of the pistons, in particular, fluid can therefore be transferred from the cylinder with a smaller internal diameter (also referred to as the small cylinder herein) of one cylinder unit into the cylinder with a larger internal diameter (also referred to as the large cylinder herein) of the other cylinder unit and from the cylinder with a larger internal diameter of one cylinder unit into the cylinder with a smaller internal diameter of the other cylinder unit, and vice versa. This brings about a situation where, for example, when the fluid is transferred from the cylinder with a smaller internal diameter of one cylinder unit into the cylinder with a larger internal diameter of the other cylinder unit, the piston which is guided in the cylinder with a smaller internal diameter covers a greater axial displacement travel than the piston which is guided in the cylinder with a larger internal diameter, on account of the differences in the internal diameters. In the vehicle according to the present disclosure, therefore, in general the two wheels of the same wheel pair are coupled to one another via the cylinder units which are connected in a fluid-conducting manner to one another. This is utilized during the lateral tilting of the vehicle body as described below.

When driving around a bend, for example, both the vehicle body and the wheels of the wheel pair tilt toward the inner side of the bend in the vehicle. The inner wheel (the wheel closest to an inside curve of the bend) compresses, while the outer wheel (the wheel closest to the outside curve of the bend) extends. During extending of the outer wheel, the outer cylinder unit which supports the outer wheel on the vehicle body lengthens. This takes place, for example, by a piston rod of the outer cylinder unit extending out of the cylinder, which piston rod is connected to the piston of the cylinder with a smaller internal diameter. According to the present teachings, this displacement movement of the piston conveys fluid from the cylinder with a smaller internal diameter of the outer cylinder unit into the cylinder with a larger internal diameter of the inner cylinder unit, which inner cylinder unit shortens by an amount that is less an amount that the outer cylinder unit lengthens, due to the different internal diameters of the cylinders. This causes the vehicle body, which is tilted laterally toward the inner side of the bend, and the centroid of the vehicle to be raised. As a result, automatic self-uprighting of the vehicle body from the lateral tilted position into the upright, neutral position is possible, since the centroid of the vehicle has the lowest location when the vehicle is in the upright, neutral position.

The use of the two cylinder units, which are connected in a fluid-conducting manner to one another, advantageously requires a small amount of installation space. The solution according to the present disclosure for the automatic self-uprighting of the laterally tiltable, multitrack vehicle can therefore be realized in a particularly compact manner.

In accordance with one aspect of the present disclosure, the piston of the cylinder with a larger internal diameter has a through opening which can be opened and closed and through which fluid can be exchanged between cylinders within the same cylinder unit.

In accordance with the present teachings and allowing for a particularly simple construction, the through opening can be closed by way of the piston of the cylinder with a smaller internal diameter (also referred to as the small piston herein). A displacement movement of the small piston in the direction of the piston of the large cylinder (also referred to as the large piston herein) thus leads automatically to the closure of the through opening, as soon as the small piston is in contact with the large piston.

In accordance with one aspect of the present disclosure, and to provide reliable axial guidance of the large piston in the large cylinder and for a compact construction of the cylinder units, the piston of the cylinder with a larger internal diameter is connected to a sleeve-like piston rod which is guided in the cylinder with a smaller internal diameter, the piston of the cylinder with a smaller internal diameter being guided displaceably in the sleeve-like piston rod.

A wheel suspension system of compact construction in accordance with the present disclosure provides that the cylinder units form wheel control parts, by way of which the wheels of the wheel pair are not only supported on the vehicle body, but also are suspended on the vehicle body. Wheel control parts, for example longitudinal links, which are provided specifically for wheel control can then be dispensed with.

It should be understood by one of skill in the art that the wheels of the wheel pair can also be suspended on the vehicle body via dedicated wheel control parts, for example, by longitudinal links or wishbones. In this case, the cylinder nits can support the wheel control parts and therefore the wheels, which are mounted rotatably on the wheel control parts, with respect to the vehicle body.

As a result, the present disclosure can be used in an advantageous manner for both for the unsteered wheels, for example of a rear axle, and for the steered wheels of a front axle of a laterally tiltable, multitrack vehicle.

In order to provide satisfactory driving comfort of the vehicle in accordance with the present teachings, each wheel of the wheel pair is mounted on the respective cylinder unit in a manner which is resilient and damped in terms of oscillations. In particular, vibrations of the respective wheel, for example, due to uneven road surfaces, are therefore absorbed directly at the wheel itself and are not substantially transmitted, at least not in an undamped manner, to the cylinder units and therefore to the vehicle body or the other wheel of the same wheel pair.

In one exemplary embodiment, the multitrack, laterally tiltable vehicle includes two wheel pairs. The first wheel pair of the vehicle forms steerable front wheels and the second wheel pair forms the rear wheels of the vehicle.

Figure 1B:
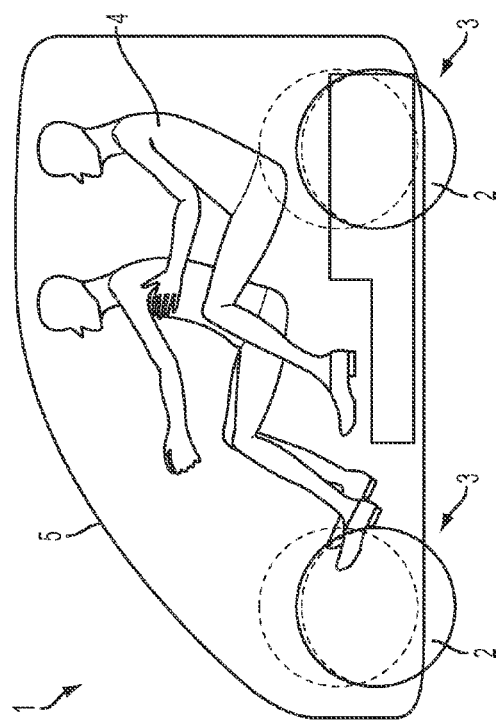
FIG. 1B shows a side view of the first exemplary embodiment of a multitrack, laterally tiltable vehicle of FIG. 1A in accordance with the present disclosure.
Figure 1C:
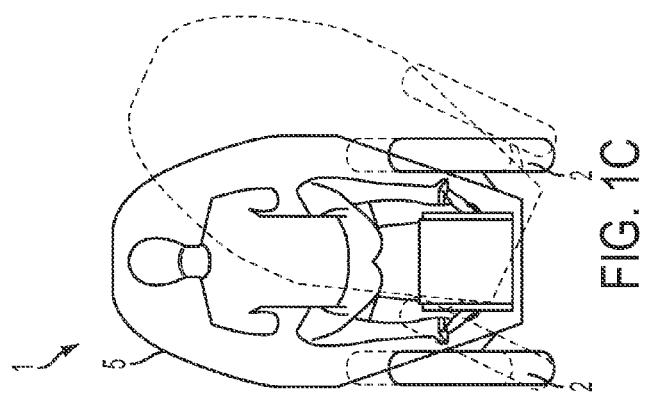
FIG. 1C shows a rear view of the first exemplary embodiment of a multitrack, laterally Liftable vehicle of FIG. 1A in accordance with the present disclosure.

FIGS. 1A-1C show a plan view, a side view, and a rear view of a first exemplary embodiment of a multitrack, laterally tiltable motor vehicle 1. In accordance with the present teachings, the vehicle 1 has a total of four wheels 2, two wheels 2 which are assigned to a common axle to form a wheel pair 3. As can be seen in FIGS. 1A-1C, the vehicle 1 has a front wheel pair 3, in which the wheels 2 are steerable and a rear, non-steerable wheel pair 3. The vehicle 1 is designed for transporting from one to two persons or occupants 4, the two vehicle occupants 4 sitting one behind the other in the vehicle 1, as shown in FIGS. 1A-1C. As shown in FIGS. 1A-1C, the vehicle 1 has a closed vehicle body 5 which protects the occupants 4, for example, against external weather influences and additionally provides the occupants 4 with improved safety in comparison with an open vehicle body.

As shown in the rear view of FIG. 10, both the vehicle body 5 and the wheels 2 tilt during the lateral tilting of the vehicle 1. The laterally tilted vehicle 1 is illustrated in the rear view by a dashed line in FIG. 1C.

The drive of the vehicle 1 may be, for example, an electric motor or a combustion engine, or a combination of an electric motor and a combustion engine (a hybrid drive).

Figure 2A:
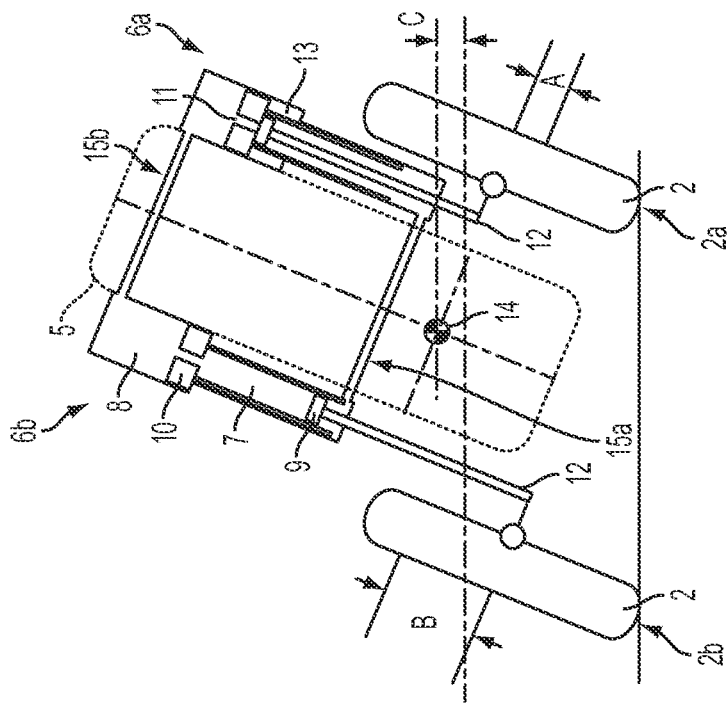
FIG. 2A is a rear view of the multitrack, laterally tiltable vehicle of FIGS. 1A-1C in an upright position.
Figure 2B:
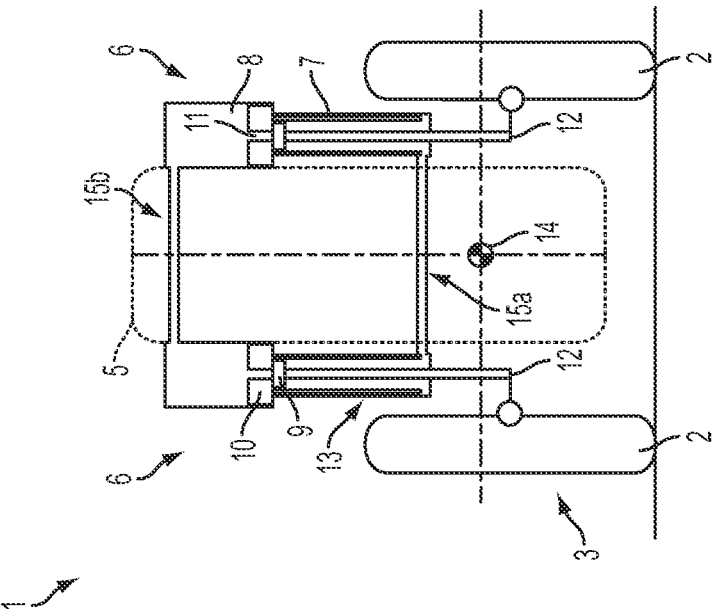
FIG. 2B is a rear view of the multitrack, laterally tiltable vehicle of FIGS. 1A-1C in a tilted position.

FIGS. 2A-2B show a first rear view and a second tilted rear view of the vehicle 1 which is shown in FIGS. 1A-1C. FIG. 2A shows the vehicle 1, as viewed from behind, in a non-inclined, upright position. FIG. 2B shows the vehicle 1 in a position which is tilted laterally to the right in the drawing. Each of FIGS. 2A-2B show the wheels 2 of the rear wheel pair 3 of the vehicle 1 which is shown in FIGS. 1A-1C.

As shown in FIGS. 2A and 2B, each of the wheels 2 of the wheel pair 3 is supported on the vehicle body 5 via a cylinder unit 6 which operates with a pneumatic or hydraulic fluid. Furthermore, it can be seen that the cylinder units 6 have in each case two cylinders 7 and 8 having different diameters, the two cylinders 7 and 8 being connected in series. In particular, in the exemplary embodiment of the vehicle 1 shown in FIGS. 2A and 2B, the internal diameter of the cylinder 7 (the small cylinder) is smaller than that of the cylinder 8 (the large cylinder). A small piston 9 or a large piston 10 is guided axially displaceably in each cylinder 7, 8, respectively. Furthermore, FIGS. 2A and 2B show that the cylinder units 6, which are assigned to each wheel 2 of the wheel pair 3, are connected in a fluid-conducting manner to one another. In particular, the two cylinders 7 and 8 of one (for example, left-hand) cylinder unit 6 are connected in a fluid-conducting manner in each case on the end side, that is to say at their respective axial ends, to the corresponding cylinders 7 and 8 of the other (for example, right-hand) cylinder unit 6. Accordingly, as shown in FIGS. 2A and 2B, the small cylinders 7 of the left-hand and right-hand cylinder units 6 are connected in a fluid-conducting manner to one another via a conduit 15a, and the large cylinders 8 of the left-hand and right-hand cylinder units 6 are fluidly connected to one another via a conduit 15b. The two cylinder units 6 therefore form a closed circuit which contains the fluid.

The pistons 9 and 10 are set up and arranged in such a way that in each case fluid, for example hydraulic oil or air, can be transferred by way of them from the small cylinder 7 of one cylinder unit 6 into the large cylinder 8 of the other cylinder unit 6, and likewise from the large cylinder 8 of one cylinder unit 6 into the small cylinder 7 of the other cylinder unit 6, as will be described in yet more detail in the following text. This applies equally to both transmission directions, that is to say both from one cylinder unit 6, for example the left-hand one, into the other cylinder unit 6, for example the right-hand one, and vice versa. In order for it to be possible to transfer the fluid from a cylinder 7 or 8 of one cylinder unit 6 into the other cylinder 8 or 7 of the other cylinder unit 6, the large piston 10 has a through opening 11 which can be opened and closed in the exemplary embodiment which is shown in FIG. 2. In the exemplary embodiment of the vehicle 1 shown in FIGS. 2A and 2B, the through opening 11 can be closed by means of the small piston 9, once the small piston 9 is in contact with the large piston 10. Therefore, as long as the small piston 9 does not adjoin the large piston 10, the through opening 11 is open, and fluid can flow continuously from the small cylinder 7 into the large cylinder 8 of the same cylinder unit 6 without axial displacement of the large piston 10, and vice versa. A transfer of fluid from the small cylinder 7 into the large cylinder 8 of the same cylinder unit 6 is not possible merely by way of a common axial displacement of the large piston 10 and the small piston 9 before the small piston 9 closes the through opening 11 of the large piston 10, as can be seen in FIG. 2B in the case of the right-hand cylinder unit 6.

Moreover, it can be gathered from FIGS. 2A and 2B that the small piston 9 is connected to a piston rod 12 and the large piston 10 is connected to a sleeve-like piston rod 13. The piston rod 13 is guided in the small cylinder 7 and the small piston 9 of the small cylinder 7 is displaceably guided in the sleeve-like piston rod 13.

FIG. 2A shows that in the upright, neutral position of the vehicle body 5 in the exemplary embodiment of the vehicle 1, the small piston 9 adjoins the large piston 10 and the small piston 9 closes the through opening 11 of the large piston 10.

FIG. 2B shows the vehicle body 5 and the wheels 2 of the wheel pair 3 tilted to the right, such as when the vehicle 1 drives around a right-hand bend, for example. Here, as the vehicle moves into the bend, the outer wheel 2b moves downward away from the vehicle body 5. The above-described coupling of the outer, left-hand cylinder unit 6b to the inner, right-hand cylinder unit 6a causes the inner wheel 2a of the same wheel pair 3 to move upward toward the vehicle body 5 in the opposite direction than the outer wheel 2b. This is because, as can be seen in FIG. 2B, the small piston 9, connected to the piston rod 12, of the outer, left-hand cylinder unit 6b moves downward and conveys the fluid which is contained in the small cylinder 7 of the outer cylinder unit 6b into the inner, right-hand cylinder unit 6a via conduit 15a. Since the small piston 9 of the inner cylinder unit 6a closes the through opening 11 of the large piston 10, the fluid which comes from the small cylinder 7 of the outer cylinder unit 6b flows into the large cylinder 8 of the inner cylinder unit 6a. Here, both pistons 9 and 10 of the inner cylinder unit 6a are displaced axially in the direction of the large cylinder 8. In order that the fluid can flow out of the small cylinder 7 of the inner cylinder unit 6a into the large cylinder 8, corresponding through openings (not shown) are provided in the sleeve-like piston rod 13 of the large piston 10. Furthermore, since the through opening 11 is closed, fluid is conveyed by way of the axial displacement of both pistons 9 and 10 of the inner cylinder unit 6a from the large cylinder 8 of the inner cylinder unit 6b first of all into the large cylinder 8 of the outer cylinder unit 6b via conduit 15b and finally through the open through opening 11 of the large piston 10 and into the small cylinder 7 of the outer cylinder unit 6b. As a result, the small piston 9 of the outer cylinder unit 6b is in turn moved in the direction of the axial end of the small cylinder 7 and the outer wheel 2b moves correspondingly further away from the vehicle body 5.

As a result of the specific configuration of the cylinder units 6 with two cylinders 7 and 8 having different internal diameters, the inner wheel 2a moves upward by a smaller amount (magnitude A) than the outer wheel 2b moves downward (magnitude B). This leads to the vehicle body 5, which is tilted laterally toward the inner side of the bend, and the centroid 14 of the vehicle 1 being raised by a magnitude C. This feature is illustrated in FIGS. 2A and 2B by two dash-dotted lines which run horizontally through the centroid 14 in these drawings. The raising of the centroid 14 during the lateral tilting of the vehicle 1 makes automatic self-uprighting of the vehicle body 5 into the upright, neutral position possible, since the centroid 14 of the vehicle 1 has the lowest location when the vehicle body 5 is in the upright, neutral position.

In order that blocking states cannot occur in the closed circuit which is formed by the fluid-conducting connection of the two cylinder units 6, the diameter of the piston rod 12 is to be selected in an approximation, that is to say without consideration of existing wall thicknesses, in accordance with the following formula:

$$\frac{ds^2}{dk^2} = \frac{dk^2}{Dk^2} \qquad (1)$$

Where ds is the diameter of the piston rod 12, dk is the diameter of the small piston 9, and Dk is the diameter of the large piston 10.

A laterally tiltable, multitrack vehicle as described above and in accordance with the present teachings is not restricted to the exemplary embodiment(s) disclosed herein, but rather also encompasses other embodiments which have an identical effect. Thus, for example, other elements, such as equalizing containers, storage vessels, pumps, valves and the like, can also be connected to the circuit which is formed by the fluid-conducting connection of the two cylinder units 6.

In addition, a laterally tiltable, multitrack vehicle in accordance with the present teachings need not be a motor vehicle and instead may be a vehicle powered by other means, including being powered by the occupants of the vehicle themselves (e.g., muscle power). That is to say, although the present teachings are described with respect to a motor vehicle, other vehicles are encompassed within the scope of the present disclosure.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art Thorn consideration of the specification and practice of the disclosure disclosed herein. It is intended that the specification and embodiment described herein be considered as exemplary only.

What is claimed is:

1. A laterally tiltable, multitrack vehicle, comprising:
   a vehicle body;
   three wheels;
   first and second wheels of the three wheels being assigned to a common axle to form a first wheel pair;
   a first cylinder unit supporting the first wheel of the wheel pair on the vehicle body and a second cylinder unit supporting the second wheel of the wheel pair on the vehicle body, each cylinder unit operating with a pneumatic or hydraulic fluid,
   wherein each cylinder unit includes a first cylinder and a second cylinder connected in series, each first cylinder having a first diameter and each second cylinder having a second diameter larger than the first diameter, a piston being axially and displaceably guided in each of the first and second cylinders,
   wherein the first and second cylinder units are fluidly connected to each other such that fluid is transferable between the first and second cylinder units by the pistons; and
   wherein fluid is transferable between cylinder units from a first cylinder of the first cylinder unit into the second cylinder of the second cylinder unit, and fluid is transferable from the second cylinder of the first cylinder unit into the first cylinder of the second cylinder unit, and
   wherein fluid is further transferable between cylinder units from a first cylinder of the second cylinder unit into the second cylinder of the first cylinder unit, and wherein fluid is further transferable from the second cylinder of the second cylinder unit into the first cylinder of the first cylinder unit;
   wherein the piston of the second cylinder has a through opening which can be opened and closed, and through which fluid can be exchanged between the first and second cylinders of the same cylinder unit.

2. The vehicle as claimed in claim 1, wherein the through opening can be closed by the piston of the first cylinder.

3. The vehicle as claimed in claim 1, wherein the piston of the second cylinder is connected to a sleeve-like piston rod, which is guided in the first cylinder, the piston of the first cylinder being displaceably guided in the sleeve-like piston rod.

4. The vehicle as claimed in claim 1, wherein the cylinder units form wheel control parts, wherein each wheel of the wheel pair is suspended on the vehicle body by a respective wheel control part.

5. The vehicle as claimed in claim 1, wherein each wheel of the wheel pair is mounted on the respective cylinder unit in a manner which is resilient and damped in terms of oscillations.

6. The vehicle as claimed in claim 1, further comprising a fourth wheel, the third and fourth wheels being assigned to a common axle to form a second wheel pair.

7. The vehicle of claim 6, wherein one wheel pair forms steerable front wheels and the second wheel pair forms rear wheels of the vehicle.

8. The vehicle of claim 1, wherein the vehicle is a motor vehicle.

9. A laterally tiltable, multitrack vehicle comprises:
a vehicle body;
three wheels, wherein first and second wheels of the three wheels are assigned to a common axle to form a first wheel pair;
a first cylinder unit supports the first wheel of the wheel pair on the vehicle body;
a second cylinder unit supports the second wheel of the wheel pair on the vehicle body;
wherein each cylinder unit includes a first cylinder and a second cylinder connected in series, each first cylinder having a first diameter and each second cylinder having a second diameter larger than the first diameter,
wherein the first cylinders of the first and second cylinder units are in continuous, direct fluid communication with each other and the second cylinders of the first and second cylinder units are in continuous, direct fluid communication with each other, and wherein fluid is further transferable between the cylinder units via a first cylinder of the one cylinder unit and a second cylinder of the other cylinder unit and vice versa.

10. The vehicle of claim 9, wherein the vehicle is a motor vehicle.

11. The vehicle of claim 9, wherein the second cylinder of the first and second cylinder units comprises a piston having a through opening configured to be opened and closed, and through which fluid can be exchanged between the first and second cylinders of the same cylinder unit.

12. The vehicle of claim 11, wherein the first cylinder of the first and second cylinder units comprises a piston moveable relative to the piston of the second cylinder.

13. The vehicle of claim 12, wherein the through opening is configured to be closed by the piston of the first cylinder engaging the piston of the second cylinder.

14. The vehicle of claim 12, wherein the first and second cylinder units further comprise a piston rod the piston of the first cylinder is connected to, wherein the piston of the first cylinder and the piston rod are moveable relative to the piston of the second cylinder.

15. The vehicle of claim 11, wherein the piston of the second cylinder is connected to a sleeve-like piston rod that is guided in, and moveable relative to, the first cylinder.

16. The vehicle of claim 15, wherein the first cylinder of the first and second cylinder units comprises a piston moveable relative to the piston of the second cylinder, wherein the piston of the first cylinder is displaceably guided in the sleeve-like piston rod.

17. The vehicle of claim 9, further comprising a conduit fluidically connecting the second cylinders of the first and second cylinder units, wherein the conduit connects axial ends of the second cylinders.

18. The vehicle of claim 17 further comprising a conduit fluidically connecting the first cylinders of the first and second cylinder units.

19. A laterally tiltable, multitrack vehicle comprises:
a vehicle body;
three wheels, wherein first and second wheels of the three wheels are assigned to a common axle to form a first wheel pair;
a first cylinder unit supports the first wheel of the wheel pair on the vehicle body; and
a second cylinder unit supports the second wheel of the wheel pair on the vehicle body;
wherein each cylinder unit includes a first cylinder and a second cylinder connected in series, each first cylinder having a first diameter and each second cylinder having a second diameter larger than the first diameter,
wherein each first and second cylinder of the first and second cylinder units comprises a piston;
wherein the first and second cylinder units are fluidly connected to each other and fluid is transferrable between the cylinder units via the first cylinder of the first cylinder unit and the second cylinder of the second cylinder unit and vice versa;
wherein the pistons of the second cylinders are connected to respective sleeve-like piston rods guided in the first cylinders, wherein the pistons of the first cylinders move within the sleeve-like piston rods.

* * * * *